US009261652B2

(12) United States Patent
Fangman et al.

(10) Patent No.: US 9,261,652 B2
(45) Date of Patent: Feb. 16, 2016

(54) OPTICAL COMPONENTS INCLUDING BONDING SLOTS FOR ADHESION STABILITY

(71) Applicant: Cisco Technology, Inc., San Jose, CA (US)

(72) Inventors: John Fangman, Leesport, PA (US); Vipulkumar Patel, Breinigsville, PA (US); Ravinder Kachru, Los Altos Hills, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 259 days.

(21) Appl. No.: 13/742,483

(22) Filed: Jan. 16, 2013

(65) Prior Publication Data

US 2013/0183010 A1    Jul. 18, 2013

Related U.S. Application Data

(60) Provisional application No. 61/587,176, filed on Jan. 17, 2012.

(51) Int. Cl.
*G02B 6/42* (2006.01)
*G02B 6/36* (2006.01)
*G02B 6/32* (2006.01)
*B32B 37/12* (2006.01)

(52) U.S. Cl.
CPC .............. *G02B 6/36* (2013.01); *B32B 37/1292* (2013.01); *G02B 6/32* (2013.01); *G02B 6/4204* (2013.01); *G02B 6/4239* (2013.01); *G02B 6/4244* (2013.01); *G02B 6/4214* (2013.01); *G02B 6/4246* (2013.01)

(58) Field of Classification Search
None
See application file for complete search history.

(56) References Cited

U.S. PATENT DOCUMENTS

| | | | |
|---|---|---|---|
| 5,852,517 A | 12/1998 | Gerber et al. | |
| 6,456,757 B2 * | 9/2002 | Kim et al. | 385/24 |
| 6,587,618 B2 | 7/2003 | Raguin et al. | |
| 7,394,106 B2 | 7/2008 | Suzuki | |
| 7,422,377 B2 | 9/2008 | Farr | |
| 7,850,374 B2 | 12/2010 | Vancoille | |
| 8,836,100 B2 * | 9/2014 | Nadeau et al. | 257/684 |
| 2002/0191943 A1 * | 12/2002 | Hughes et al. | 385/137 |
| 2003/0007754 A1 * | 1/2003 | Terashima | 385/92 |
| 2004/0017977 A1 | 1/2004 | Lam et al. | |
| 2006/0221586 A1 * | 10/2006 | Yang | 361/782 |
| 2006/0263002 A1 * | 11/2006 | Pocha et al. | 385/12 |
| 2008/0035948 A1 * | 2/2008 | Shin et al. | 257/99 |
| 2008/0317412 A1 * | 12/2008 | Sato | 385/55 |
| 2010/0067852 A1 * | 3/2010 | Dangel et al. | 385/83 |
| 2010/0072555 A1 * | 3/2010 | Meng et al. | 257/369 |
| 2011/0127633 A1 | 6/2011 | Nadeau et al. | |
| 2011/0242263 A1 * | 10/2011 | Takahashi et al. | 347/258 |
| 2012/0099816 A1 * | 4/2012 | Wilson | 385/33 |
| 2013/0314707 A1 * | 11/2013 | Shastri et al. | 356/399 |
| 2014/0161385 A1 * | 6/2014 | Lessard et al. | 385/14 |

\* cited by examiner

*Primary Examiner* — Tina Wong

(57) ABSTRACT

An opto-electronic apparatus comprises a substrate for supporting a plurality of components forming an opto-electronic assembly and an optical component attached to the substrate with an adhesive material, such as a solder or epoxy. The optical component is formed to include a plurality of bond slots disposed in parallel across at least a portion of the bottom surface of the optical component, the plurality of bond slots providing a path for a liquid adhesive material and improving the ability to displace the liquid adhesive material as the component is pressed into the surface of the substrate during the attachment process.

19 Claims, 3 Drawing Sheets

OPTICAL COMPONENTS INCLUDING BONDING SLOTS FOR ADHESION STABILITY

CROSS-REFERENCE TO RELATED APPLICATIONS

This application claims the benefit of U.S. Provisional Application No. 61/587,176, filed Jan. 17, 2012 and herein incorporated by reference.

TECHNICAL FIELD

The present disclosure relates generally to opto-electronic assemblies, particularly to the inclusion of bonding slots on the attachment surface of optical components to improve the attachment process.

BACKGROUND

Many types of opto-electronic modules comprise a number of separate optical and electrical components that require precise placement relative to one another. A silicon (or glass) carrier substrate (sometimes referred to as an interposer) is generally used as a support structure for these components and may, at times, also provide the desired electrical or optical signal paths between selected components. In other arrangements, the optical and electrical components may be directly placed on and within a silicon surface layer of a silicon-on-insulator (SOI)-based optical platform. Regardless of the structure of the support arrangement, optical alignment between various optical components is required to ensure that the integrity of the optical signal path is maintained.

As the size of opto-electronic components continues to shrink, the need to place them on an interposer (or other supporting substrate member) with improved alignment accuracy increases. This is particularly true in optics where components such as lenses and fiber/waveguide connectors form part of an optical signal path and inter-component alignment is necessary to maintain the integrity of the signal path. For example, in a silicon photonic assembly, components such as microlenses and optical fibers may need to be aligned to one another with sub-100 nm positional accuracy as they are attached to a common substrate, such as an interposer or silicon-on-insulator (SOI) substrate.

While the ability to accurately position these components on a substrate is a necessary requirement of the fabrication process, the maintenance of these positions over the lifetime of the assembly is also important. It is quite possible that a given assembly will be subjected to variations in temperature, humidity and the like over its lifetime, where these environmental changes may degrade the quality of the adhesive bond and cause one component to shift relative to another. One way to address the lifetime issue is to utilize as thin a bond line as possible in the original attachment process (a "bond line" being defined as the thickness of the adhesive between the two surfaces being bonded). It has been found that bond lines on the order of tens of microns will increase the lifetime stability of micro-component assemblies. However, this relatively thin bond line has presented problems in terms of the friction-based restriction of the flow of the adhesive (i.e., molecular flow regime), associated with the relatively large surface areas to be joined relative to the total volume (relatively small) of the adhesive. This frictional problem associated with the small amount of adhesive material then also limits the amount of post-placement adjustment of the micro-component that may be performed, eliminating the possibility of performing active or quasi-active alignment in many optical or opto-electronic systems. Indeed, as the bond line reduces to a size of less than five microns, it becomes increasingly difficult to displace the liquid material between the lens and substrate (i.e., hydrostatic compression).

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Overview

Figure 1:
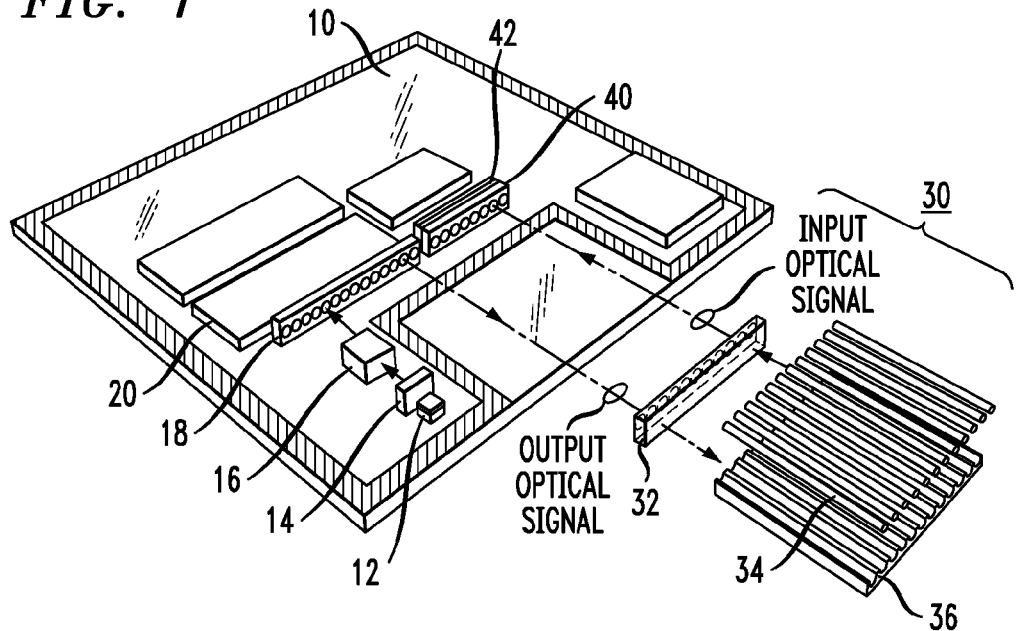
FIG. 1 illustrates an exemplary opto-electronic assembly including silicon-based lenses.

An opto-electronic apparatus comprises a substrate for supporting a plurality of components forming an opto-electronic assembly and an optical component attached to the substrate with an adhesive material, such as a solder or epoxy. The optical component is formed to include a plurality of bond slots disposed in parallel across at least a portion of the bottom surface of the optical component, the plurality of bond slots providing a path for a liquid adhesive material and improving the ability to displace the liquid adhesive material as the component is pressed into the surface of the substrate during the attachment process.

Example Embodiments

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, adding stages to the disclosed methods. Accordingly, the following detailed description does not limit the invention. Instead, the proper scope of the invention is defined by the appended claims.

Silicon-based lenses are used in opto-electronic assemblies to couple light at high efficiencies into fibers, waveguides and other optical devices. FIG. 1 illustrates an exemplary opto-electronic assembly including silicon-based lenses. These lenses are used to modify the spatial qualities of an optical beam (e.g., focus, collimate, etc.) as necessary. The arrangement as shown in FIG. 1 includes an interposer 10 that is used as a support substrate for the several components forming the opto-electronic assembly. In this case, the opto-electronic assembly includes a transmitter portion comprising a laser diode 12 for generating an optical output signal.

A microlens 14 is shown as placed in the optical output signal path from laser diode 12. An optical isolator 16 is positioned beyond microlens 14 and is used to prevent reflected optical signals from re-entering laser diode 12. The signal exiting optical isolator 16 then passes through a microlens array 18 and enters a CMOS photonic chip 20.

Signal processing operations are performed on the optical signal within photonic chip 20 (for example, modulation with a data signal), creating one or more optical output signals that exit photonic chip 20 as shown. These optical output signals pass again through microlens array 18 and are coupled into an optical coupling interface arrangement 30.

In the particular embodiment shown in FIG. 1, optical coupling interface arrangement 30 is shown in an exploded view and comprises a microlens array 32 and an associated optical fiber array 34, with optical fiber array 34 supported on a substrate 36. Optical coupling interface arrangement 30 is also shown as providing a signal path for an input (received) optical signal which propagates along one or more fibers of the optical fiber array 34. The input optical signal then passes through microlens array 32 and is thereafter directed through a collimating lens 40 into an optical receiving component 42 (for example, a photodiode).

As mentioned above, various ones of the components as shown in FIG. 1 are bonded in position on interposer 10 using a solder or suitable epoxy. The gap between the bottom of the components and the top of the interposer that is filled by the bonding material is generally referred to as a "bond line". In most opto-electronic assemblies, it is desired to keep the bond lines as small as possible in order to create a bond joint that will remain stable for the life of the assembly. However, the use of small bond lines (on the order of 5 µm or less) makes it difficult to displace the liquid bonding material during the attachment process (hydrostatic compression). The arrangement of the present invention addresses this problem by including one or more bond slots on the contacting surface of the components, providing a flow path for the liquid bonding material that reduces the pressure in the joint, improving the bonding process and maintaining the desired stability associated with a small bond line.

Figure 2:
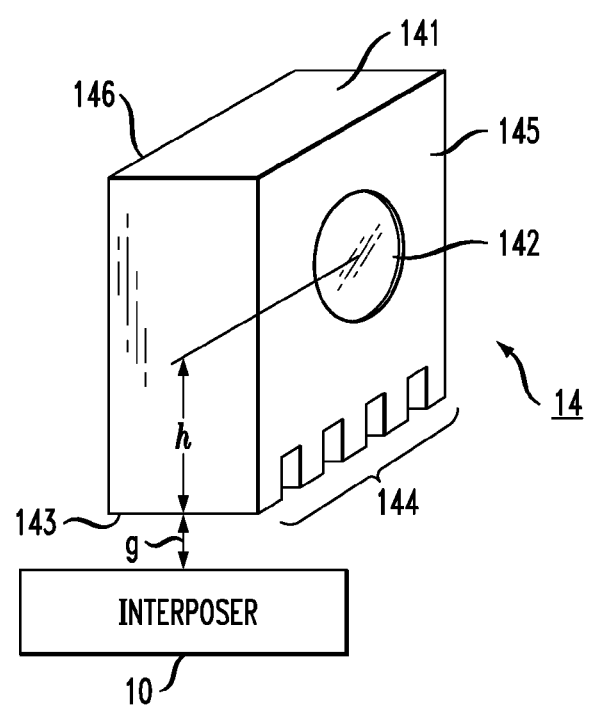
FIG. 2 is an isometric view of a silicon microlens including bond slots useful in reducing the pressure associated with the adhesion process by providing a path for the liquid adhesive material to flow.

FIG. 2 is an isometric view of a silicon microlens including bond slots useful in reducing the pressure associated with the adhesion process by providing a path for the liquid adhesive material to flow. In particular, FIG. 2 illustrates the details of microlens 14 as used in the arrangement of FIG. 1. Microlens 14 comprises a rectangular silicon housing 141 for supporting a silicon lens 142 at a predetermined height h above a bottom surface 143 of microlens 14. The predetermined height h is determined in accordance with the known position of the optical beam exiting laser diode 12 (see FIG. 1).

A plurality of bond slots 144 are formed across bottom surface 143 of microlens 14, the bond slots formed in a parallel configuration from a front surface 145 to a rear surface 146 of microlens 14. Bond slots 144 may be formed by etching channels in the silicon material forming housing 141 or, alternatively, may be formed using a micromachining process or any other suitable process. The specific number of slots that are formed, as well as their specific dimensions (in particular, the depth of the slot with respect to the size of the housing), are design considerations of the individual and may be modified as necessary for different configurations.

Regardless of the process used to form bond slots 144, their presence creates a path for the adhesive liquid to maintain a viscous flow as microlens 14 is aligned with and attached to interposer 10. In the illustration of FIG. 2, interposer 10 is shown as being separated from bottom surface 143 of microlens 14 by a relatively small gap g (which is on the order of less than 5 µm). As mentioned above, the relatively small dimension of this gap is problematic when using a liquid adhesive material to bond microlens 14 to interposer 10, since it is difficult to displace the liquid between the surfaces being joined (i.e., hydrostatic compression).

Therefore, bond slots 144 reduce this pressure in the adhesion region (i.e., the "joint") during the attachment process by providing a path for the liquid adhesive material to flow. By providing this path for the liquid, the settling time for the curing of the bond is reduces and the efficiency of the attachment and alignment process is increased. Moreover, the stability of the bond is maintained by allowing for the bond line (i.e., "gap g") to remain as small as possible.

Figure 3:
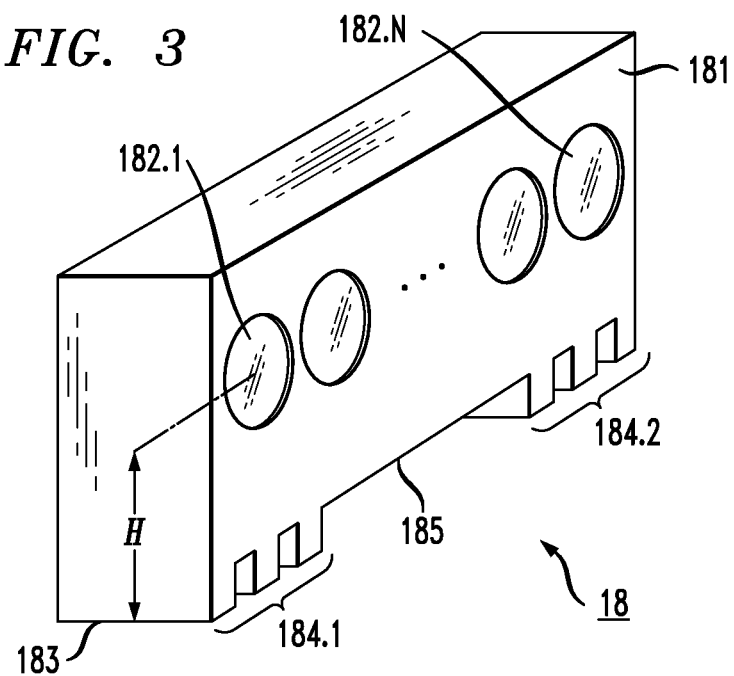
FIG. 3 is an isometric view of a lens array formed to include two groups of bond slots at opposing ends of the array housing.

FIG. 3 is an isometric view of a lens array formed to include two groups of bond slots at opposing ends of the array housing. In particular, FIG. 3 illustrates an exemplary embodiment of microlens array 18 as included in the arrangement of FIG. 1. As shown, microlens array 18 comprises a silicon housing 181 formed to include a plurality of separate lens elements 182.1-182.N, disposed in alignment along a transverse direction (x-axis) within silicon housing 181. As shown, the plurality of lens elements 182 is disposed a predetermined height H above a bottom surface 183 of microlens 18.

In this particular configuration, the bonding arrangement is formed to include two separate groups of bond slots, shown as a first group of bond slots 184.1 and a second group of bond slots 184.2, disposed at opposing ends of bottom surface 183. As shown, each group is formed as a set of parallel bond slots. For elongated structures such as a lens array, one embodiment of the present invention is configured to utilize bond slot groups 184.1 and 184.2, with a raised region 185 disposed along a central portion of bottom surface 183. As with the single microlens arrangement as described above in association with FIG. 2, the inclusion of bond slot groups 184.1 and 184.2 with microlens array 18 provides a path for the liquid adhesive material to flow during the bonding process, improving the stability of the created bond between the interposer and the microlens array.

The inclusion of central raised region 185 ensures that housing 181 is attached to the substrate (not shown) at only the two end terminations associated with the groups of bond slots 184.1 and 184.2, with the central region of bottom surface 183 remaining raised above the attachment surface (and, therefore, not physically attached to interposer 10).

If, instead, a continuous bond line had been formed across the complete length L of bottom surface 183, any subsequent thermal expansion coefficient mismatch between the adhesive material and the combination of microlens array 18 and interposer 10 may cause a bend or twist along microlens array 18. Bending or twisting of microlens array 18 may result in one or more of the individual lens elements 182 moving out of alignment with its defined signal path. Therefore, by using two groups of bond slots at opposing ends of the microlens array housing instead of a continuous bond line, the central portion of the housing is free to absorb any movements associated with changes in temperature.

Figure 4:
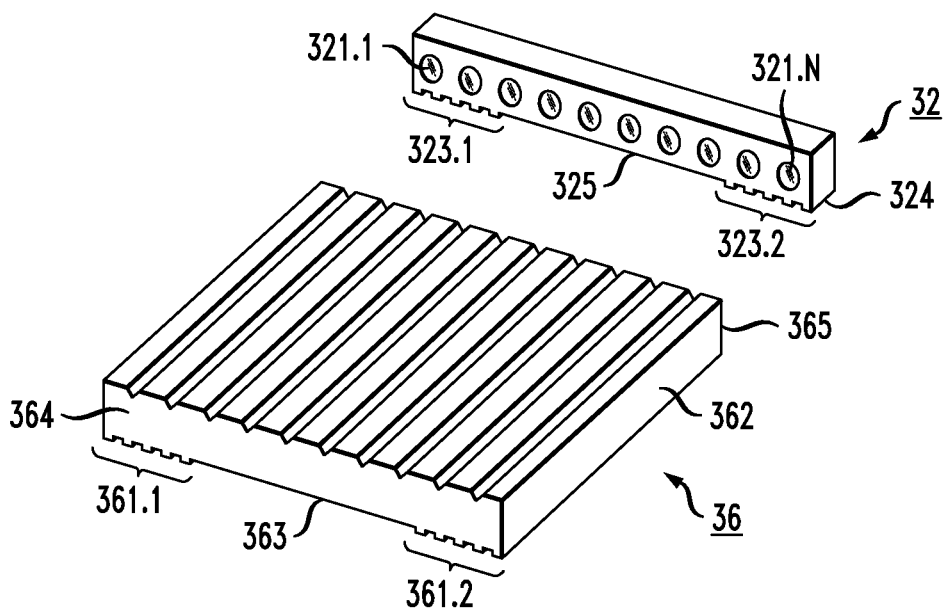
FIG. 4 illustrates an exemplary coupling interface arrangement including bond slots formed on attachment surfaces of the separate components within the arrangement.

FIG. 4 illustrates an exemplary optical coupling interface arrangement including bond slots formed on attachment surfaces of the separate components within the arrangement. In particular, FIG. 4 shows microlens array 32 and substrate 36 used to support a plurality of optical waveguides (the particular attachment locations for these elements on interposer 10 shown in FIG. 1). Referring back to FIG. 4, microlens array 32 is shown as comprising a plurality of separate lens elements 321.1-321.N formed within a silicon housing 322. As shown, a pair of bond slot groups 323.1 and 323.2 is formed at opposite ends of a bottom surface 324 of microlens array 32, each group comprising a set of parallel bond slots. A raised region 325 is shown as formed in the central area of bottom surface 324. This configuration, similar to that described above in association with microlens array 18 of FIG. 3, is used to permanently bond the opposing ends of microlens array 32 to the associated substrate, while allowing the central region to move and absorb any shifting associated with mismatches in thermal expansion between the components.

Substrate 36 is shown in FIG. 4 as similarly formed to comprise bond slots 361 within a bottom surface 362 of substrate 36, in the form of a first bond slot group 361.1 at a first end of substrate 36 and a second bond slot group 361.2 at a second, opposing end of substrate 36. A central raised region 363 is formed as shown between the two groups of bond slots 361. As show in FIG. 4, bond slots 361 are formed in a parallel configuration so as to extend from a front surface 364 to a rear surface 365 of substrate 36.

Referring to both FIGS. 1 and 4, microlens array 32 and substrate 36 are attached to interposer 10 in the regions shown, where the inclusion of bond slots on the bottom surfaces of both of these components allows for the components to be fixed to interposer 10 in a manner that maintains the critical alignment between the optical fibers 34 and the input and output optical signals associated with the opto-electronic assembly as shown in FIG. 1 while also providing the stability associated with maintaining a relatively small bond line (e.g., less than 5 μm). That is, the bond slots provide a path for the liquid adhesive material to flow and achieve a rigid, fixed attachment when using a small bond line.

While not shown in particular, it is to be understood that the particular components associated with the receiving portion of the opto-electronic assembly shown in FIG. 1 may also include bond slots to improve the stability of their attachment to interposer 10. In particular, both collimating lens 40 and optical receiving component (photodiode) 42 may be formed to include bond slots in accordance with the present invention to facilitate the creation of stable bonds in an efficient manner.

Figure 5:
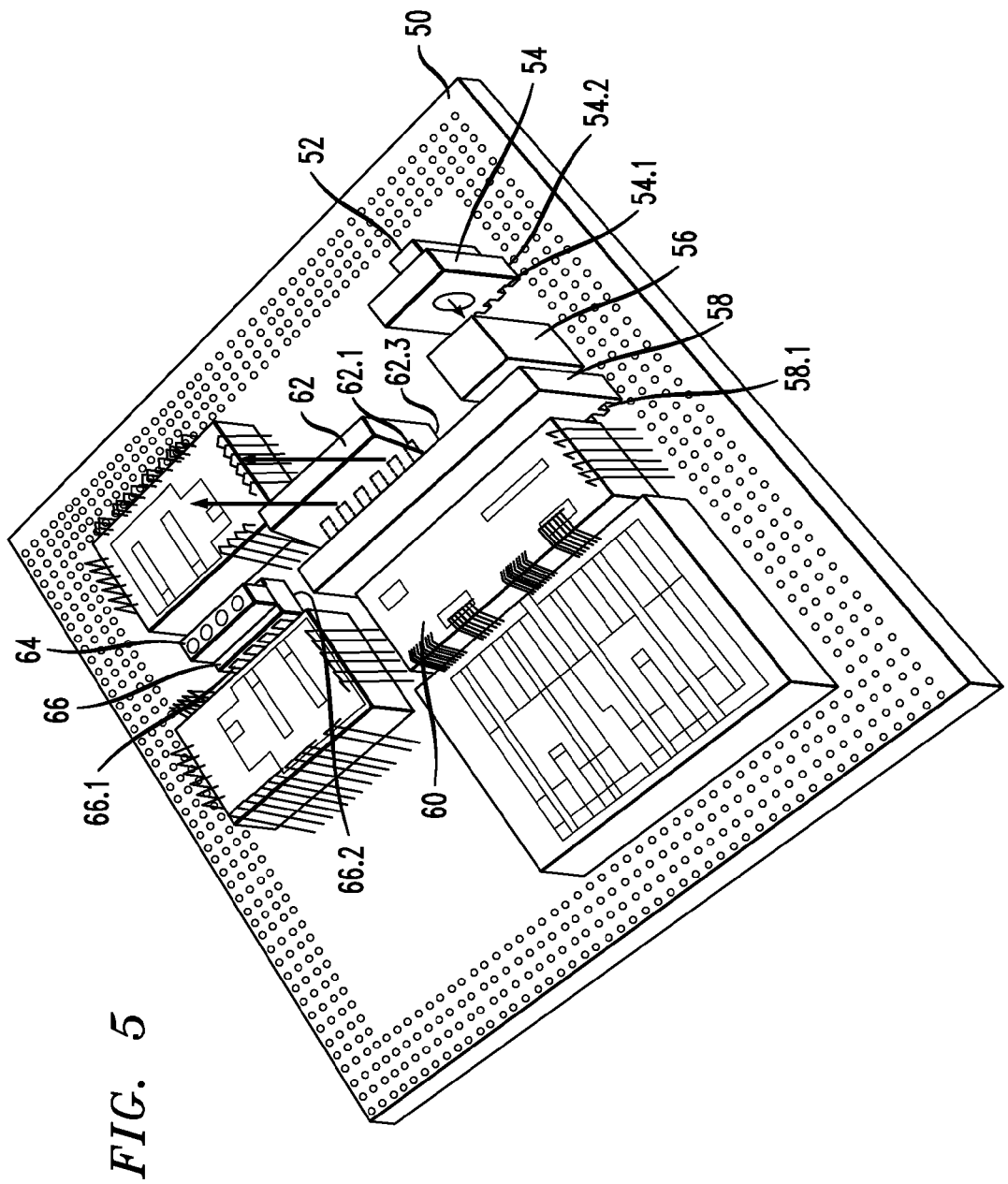
FIG. 5 illustrates another opto-electronic assembly including optical components configured to include bond slots.

It is also to be understood that the inclusion of bond slots on optical components may be used with any opto-electronic assembly. FIG. 5 illustrates another opto-electronic assembly including optical components configured to include bond slots. In the embodiment as shown in FIG. 5, the input and output optical signal paths are re-directed to extend in a direction orthogonal to the plane of the interposer (in this case, along the y-axis of the orientation shown in FIG. 5).

The arrangement as shown in FIG. 5 comprises an interposer substrate 50 upon which the various opto-electronic components are attached. As with the embodiment of FIG. 1, the arrangement as shown in FIG. 5 includes a laser diode 52, a microlens 54 aligned with the output of laser diode 52 and used to focus the laser output signal. An optical isolator 56 is included in the signal path beyond microlens 54, where the optical signal passing through isolator 56 next encounters a microlens array 58. The optical beam passing through microlens array 58 is then coupled into photonic integrated circuit 60, creating a plurality of optical output signals O that thereafter pass through microlens array 58.

In this embodiment of the invention, the output from microlens array 58 next encounters a turning mirror element 62, which intercepts the plurality of optical output signals and re-directs them upward, as shown. Also shown in this arrangement is a plurality of optical input signals I that enter a plurality of photodiodes 64 disposed at a location on interposer 10 that will align with the paths of the input optical signals.

Bond slots may be included with various ones of these opto-electronic components to improve the quality of the joint between interposer 50 and each of components. For example, microlens 54 is shown as including a plurality of bond slots 54.1 disposed in parallel along bottom surface 54.2 of microlens 54. Microlens array 58 is shown as including a pair of bond slot groups, denoted as a first bond slot group 58.1 at a first end termination. A second bond slot group is formed at the opposing end, and is not visible in this view. Also not evident in this view is a central raised region may be formed between these individual bond slot groups to mitigate the effects of varying temperature conditions and differences in the coefficient of thermal expansion between interposer 50 and microlens array 58.

Additionally, turning mirror element 62 is shown as including a plurality of parallel bond slots 62.1 formed along bottom surface 62.3 of turning mirror element 62 (some parallel bond slots shown in phantom). Photodiodes 64 are also formed to include a plurality of bond slots, where in this particular configuration photodiodes 64 are disposed on a silicon mounting element 66, with a plurality of bond slots 66.1 formed across bottom surface 66.2 of mounting element 66.

While the invention has been described in terms of different embodiments, those skilled in the art will recognize that the invention can be practiced with various modifications that are considered to fall within the spirit and scope of the invention as best defined by the claims appended hereto. Furthermore, while the specification has been described in language specific to structural features and/or methodological acts, the claims are not limited to the features or acts described above. Rather, the specific features and acts described above are disclosed as examples for embodiments of the invention.

What is claimed is:

1. An apparatus, comprising:
a substrate;
an opto-electronic assembly supported by the substrate; and
an optical component optically coupled to the opto-electronic assembly,
wherein a bottom surface of the optical component is attached to the substrate with an adhesive material, the optical component including a plurality of bond slots disposed in a parallel configuration across at least a portion of the bottom surface of the optical component, the plurality of bond slots extending from a front surface of the optical component to a rear surface of the optical component to provide paths for displacing the adhesive material in a liquid state during attachment of the optical component to the substrate.

2. The apparatus of claim 1, wherein the apparatus further comprises a plurality of optical components, and each of the plurality of optical components includes a plurality of bond slots.

3. The apparatus of claim 1, wherein the optical component is configured to include a first group of bond slots formed at a first end termination of the bottom surface and a second group of bond slots formed at a second, opposing end termination of the bottom surface.

4. The apparatus of claim 3, wherein the bottom surface of the optical component further comprises a central raised region between the first and second groups of bond slots, the central raised region remaining unattached to the substrate surface.

5. The apparatus of claim 3, wherein the optical component comprises an array component for housing a plurality of separate optical elements along an extended transverse direction.

6. The apparatus of claim 5, wherein the array component comprises a microlens array for housing a plurality of separate lens elements.

7. The apparatus of claim 5, wherein the array component comprises an optical interface arrangement for housing a plurality of optical signal paths in an array configuration.

8. The apparatus of claim 7, wherein the plurality of optical signal paths comprises a plurality of optical fibers.

9. The apparatus of claim 7, wherein the plurality of optical signal paths comprises a plurality of optical waveguides.

10. An apparatus, comprising:
   an optical component including
      a housing including a front surface, a rear surface, and a bottom surface, wherein the front surface is configured to be optically coupled with an opto-electronic assembly, the rear surface opposite to and optically coupled with the front surface, and a bottom surface connecting the front surface to the rear surface, the bottom surface configured to be attached to a substrate to support the optical component, wherein the bottom surface comprises a plurality of bond slots disposed in a parallel configuration across at least a portion of the bottom surface, the plurality of bond slots extending from the front surface to the rear surface to provide a path for displacing liquid adhesive material disposed between the bottom surface and the substrate during attachment of the optical component to the substrate; and
      a microlens component disposed in a passageway through the housing, wherein the passageway extends from a first opening in the front surface to a second opening in the rear surface of the housing, wherein an optical axis of the microlens component extends through the first and the second openings.

11. The apparatus of claim 10, wherein the optical component is configured to include a first group of bond slots formed at a first end termination of the bottom surface and a second group of bond slots formed at a second, opposing end termination of the bottom surface.

12. The apparatus of claim 11, wherein the bottom surface of the optical component further comprises a central raised region between the first and second groups of bond slots.

13. The apparatus of claim 10, wherein the microlens component comprises a microlens array for supporting a plurality of separate lens elements in a linear array configuration and the bottom surface of the component includes separate groups of bond slots disposed at opposing end terminations of the bottom surface.

14. A method, comprising:
   dispensing a liquid adhesive material on a predetermined region of a substrate; and
   positioning a plurality of bond slots of an optical component into the liquid adhesive material dispensed on the predetermined region such that the liquid adhesive material flows into the bond slots and facilitates a stable attachment between the bottom surface of the optical component and the substrate, wherein the substrate supports the optical component, wherein the plurality of bond slots are formed in a parallel configuration across a bottom surface of the optical component, and the plurality of bond slots extending from a front face to a rear face of the optical component.

15. The method of claim 14, wherein the plurality of bond slots are formed across a majority of the bottom surface of the optical component.

16. The method of claim 14, wherein the plurality of bond slots are formed as a first group of bond slots at a first end termination of the bottom surface of the optical component and a second group of bond slots at a second end termination of the bottom surface of the optical component.

17. The method of claim 16, further comprising the step of forming a central raised region across the bottom surface of the optical component between the first and second groups of bond slots.

18. The method of claim 14, wherein the provided component is a microlens.

19. The method of claim 14, wherein the provided component is an optical coupling interface arrangement.

* * * * *